March 14, 1967  J. ANTOS  3,308,718
SHUTTER MECHANISM FOR SLIDE PROJECTORS
Original Filed Nov. 9, 1962  10 Sheets-Sheet 5
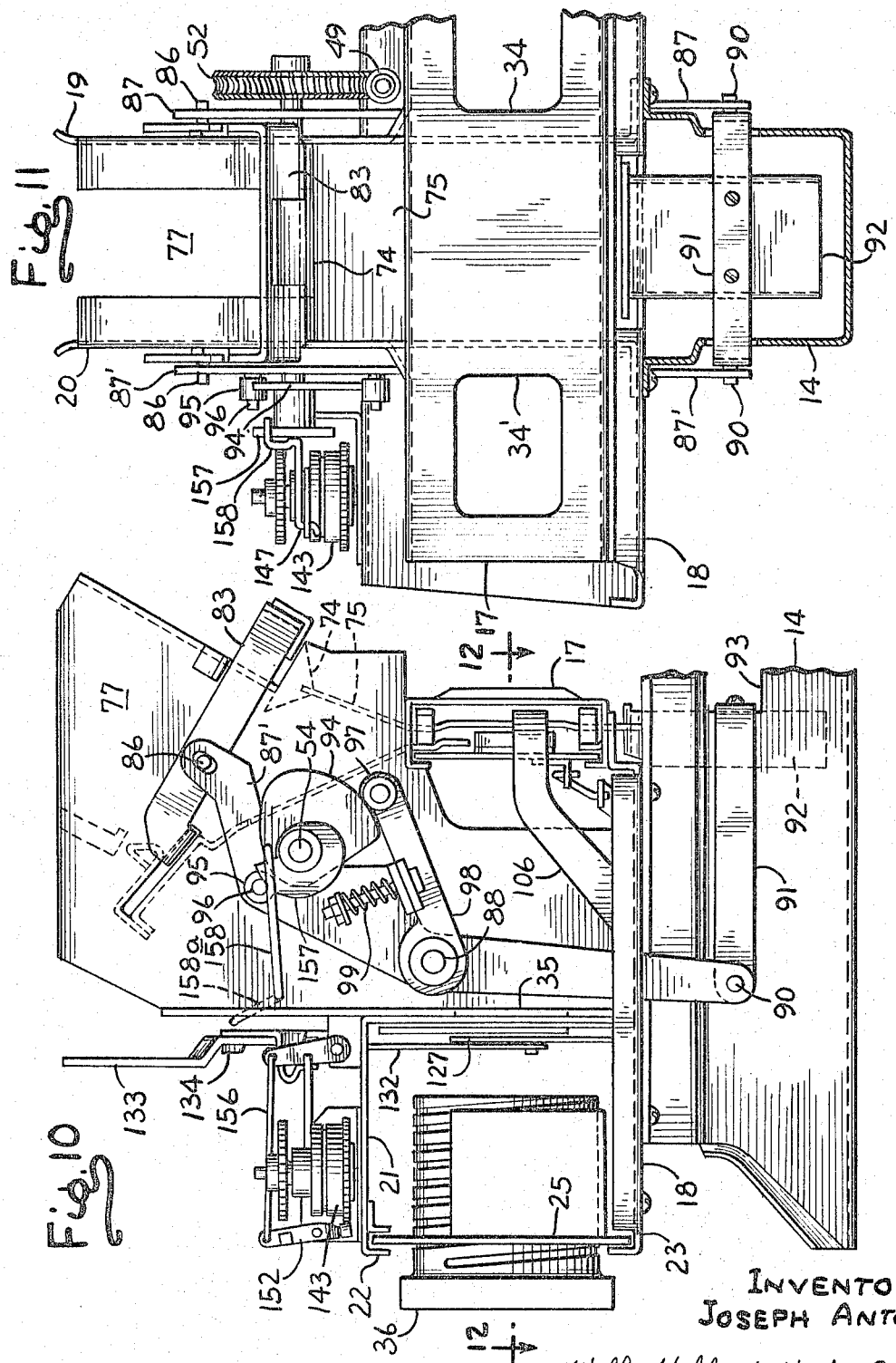
INVENTOR
JOSEPH ANTOS
by: Wolfe, Hubbard, Voit & Osann
ATTYS.

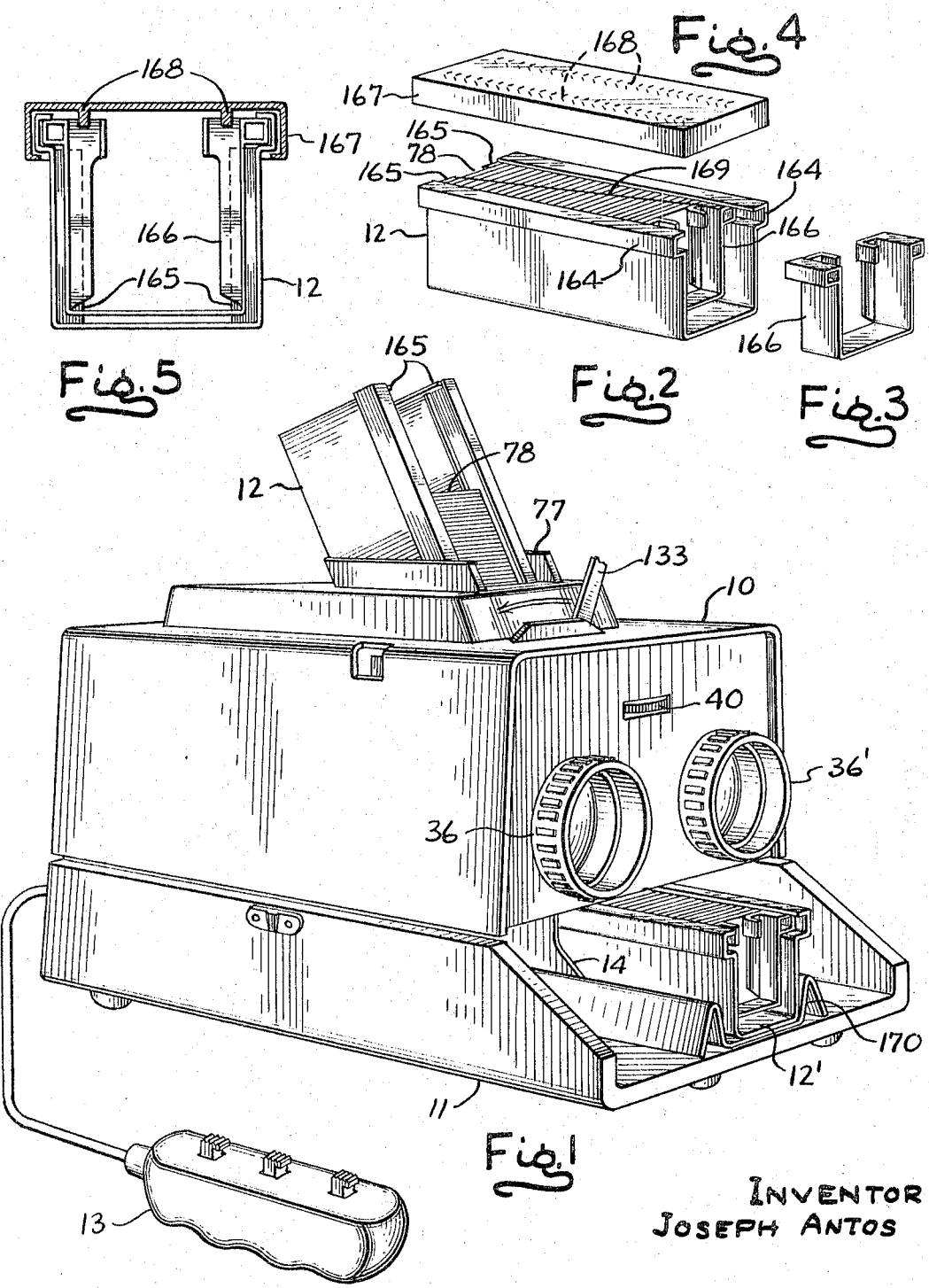

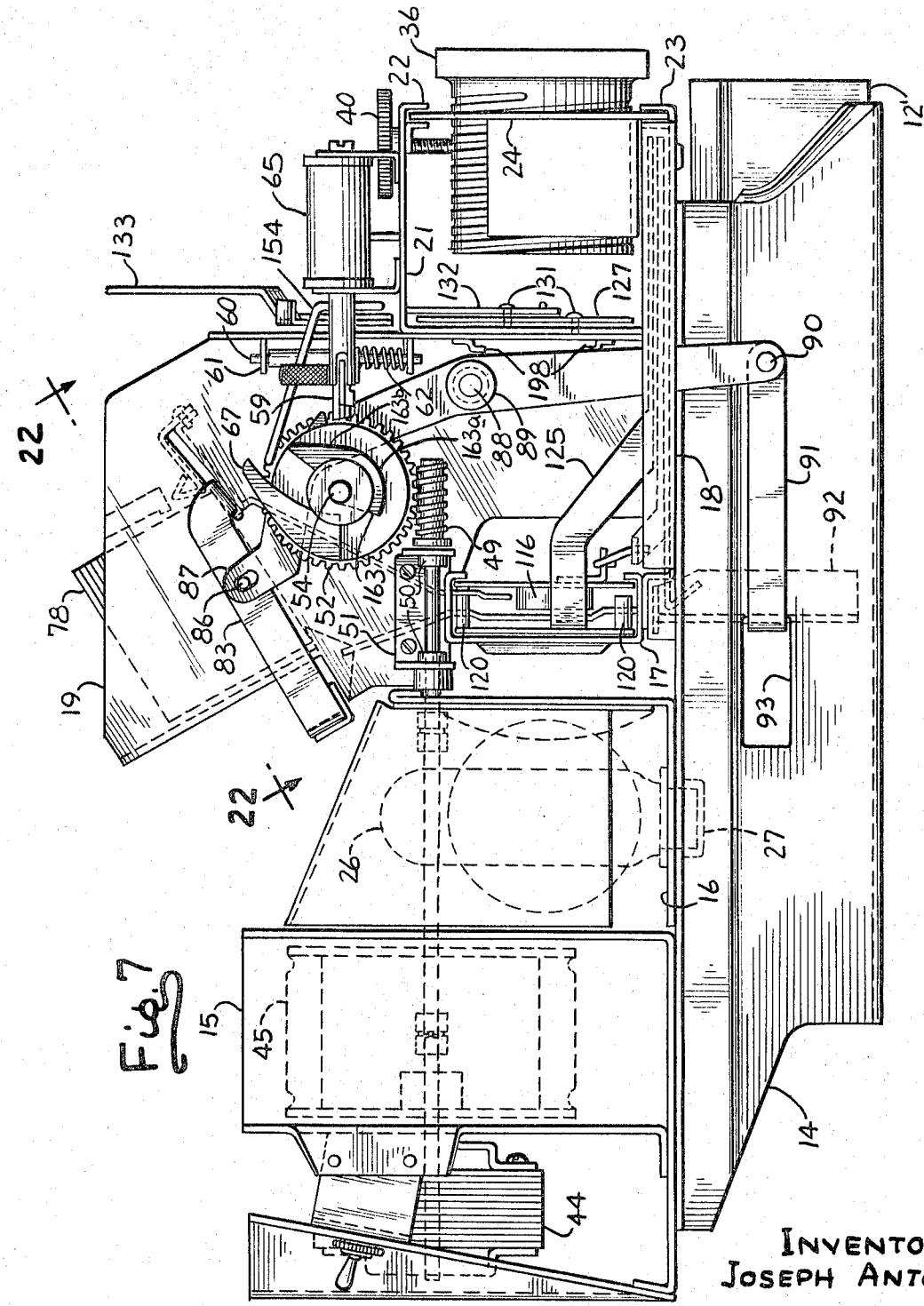

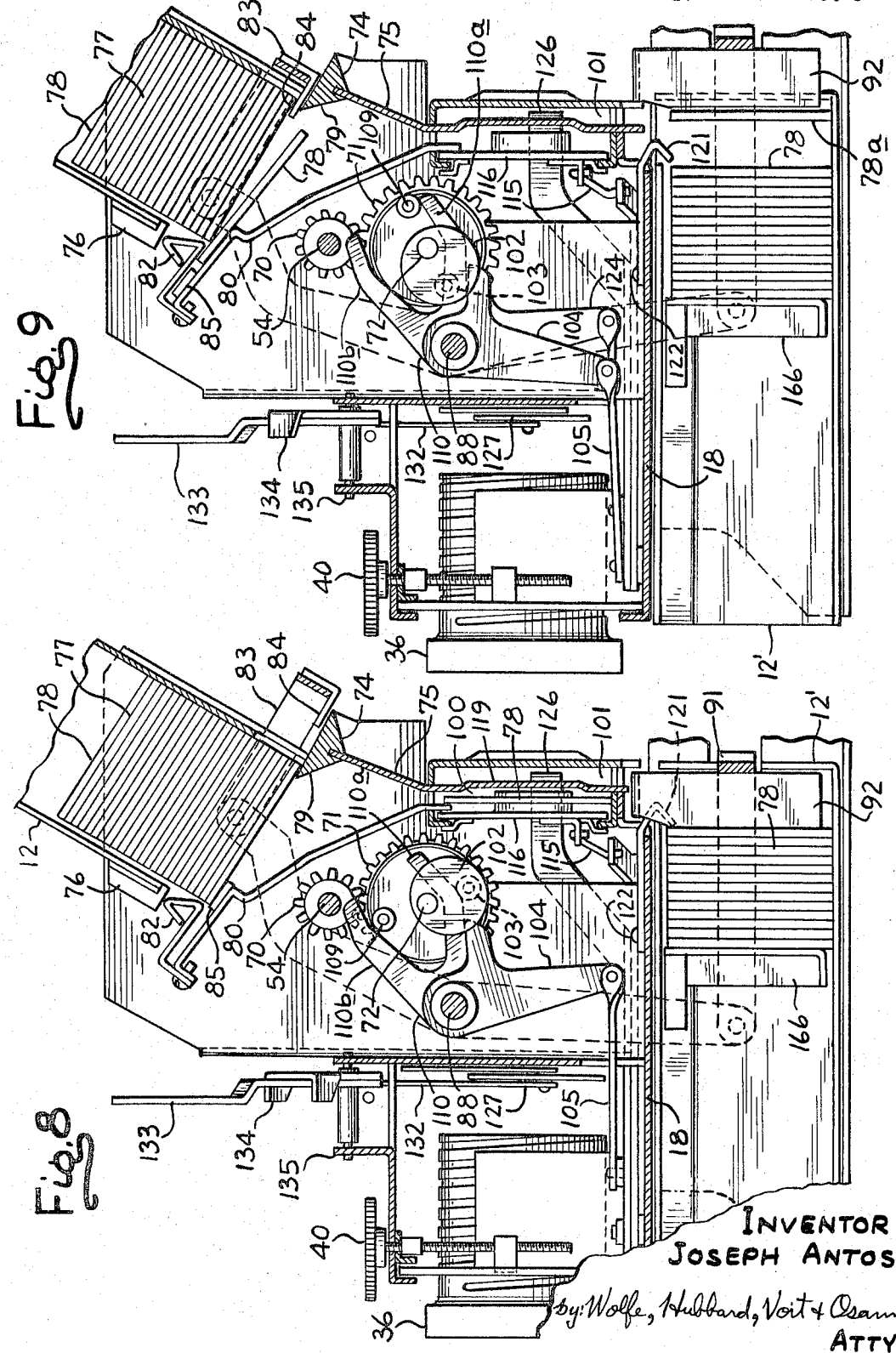

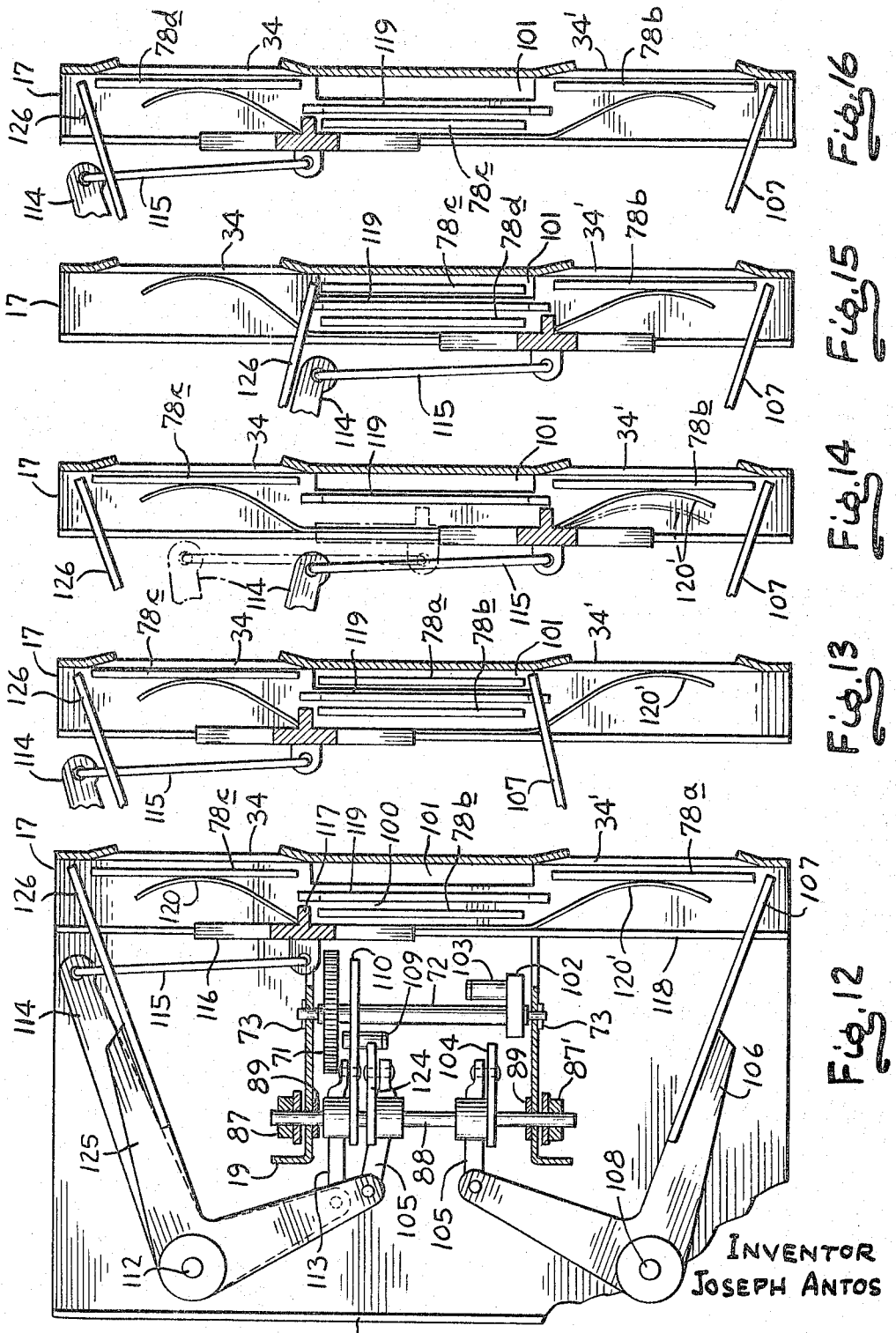

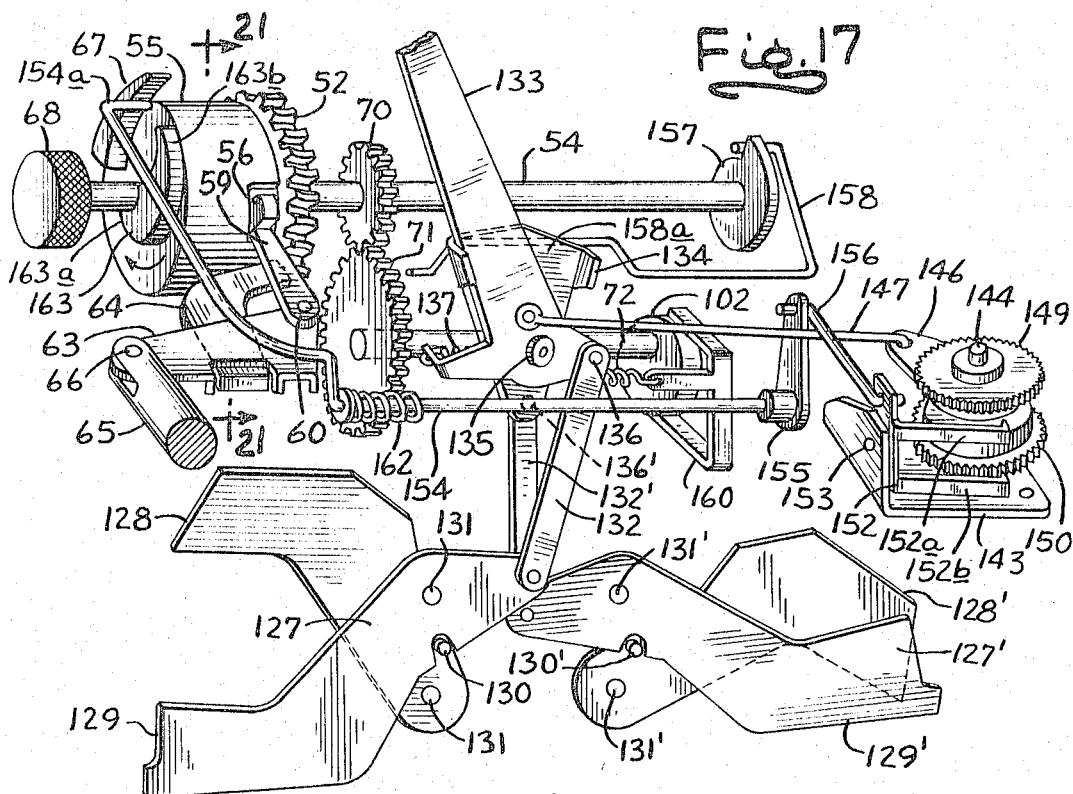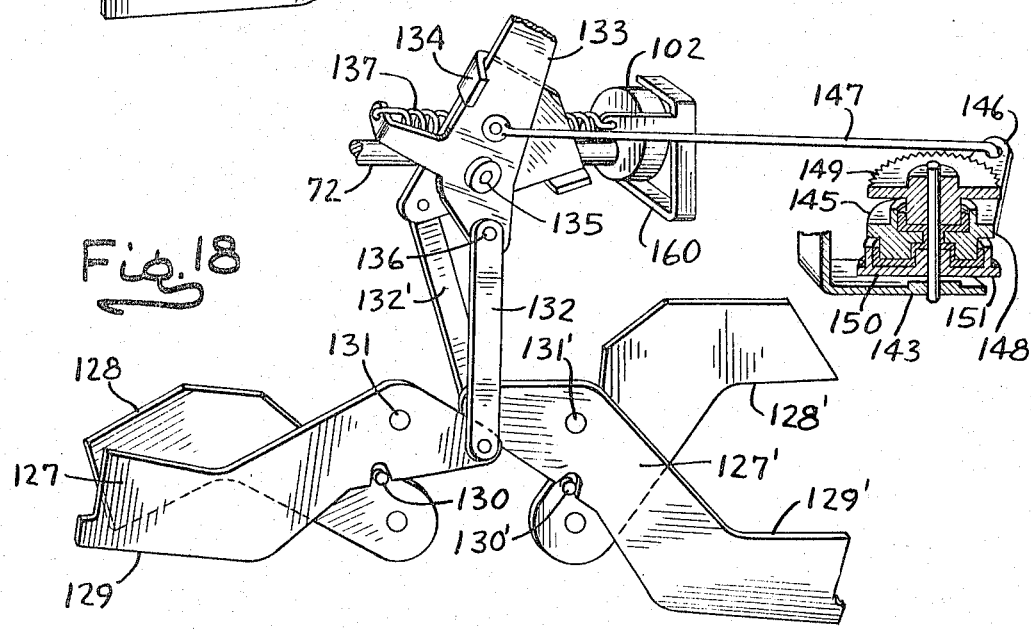

March 14, 1967 J. ANTOS 3,308,718
SHUTTER MECHANISM FOR SLIDE PROJECTORS
Original Filed Nov. 9, 1962 10 Sheets-Sheet 8

INVENTOR
JOSEPH ANTOS
by: Wolfe, Hubbard, Voit & Osann
ATTYS.

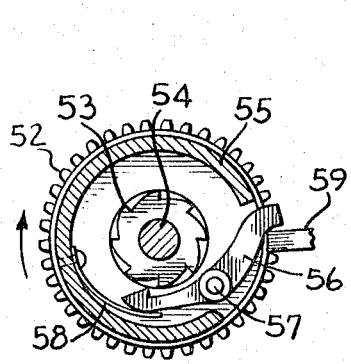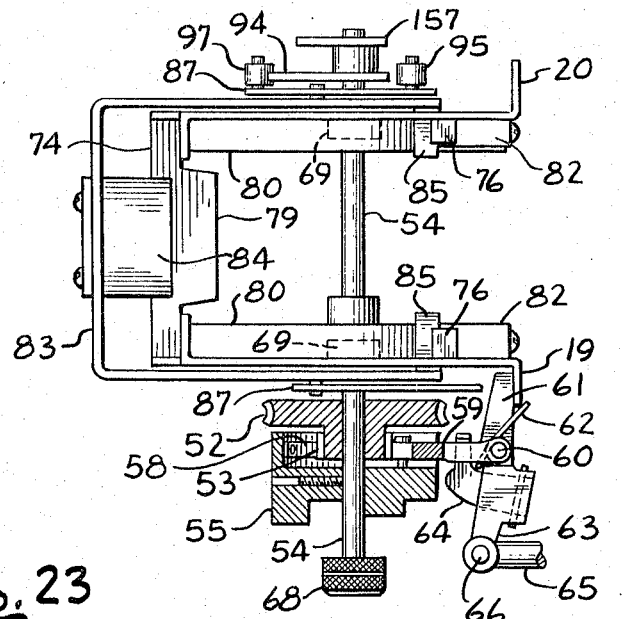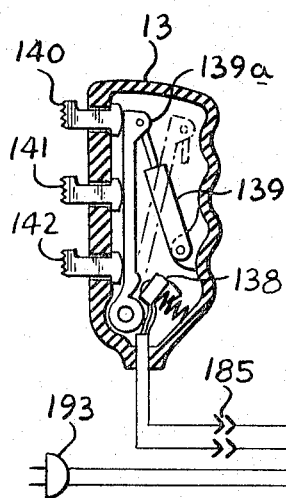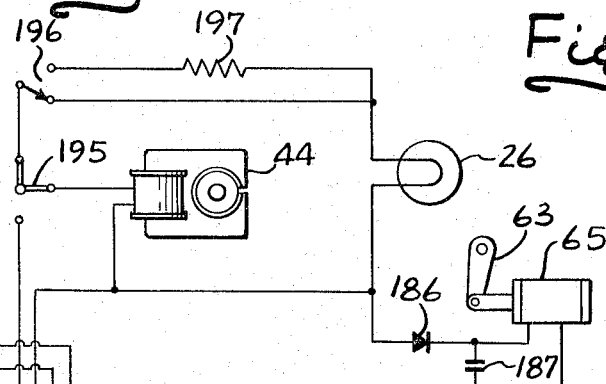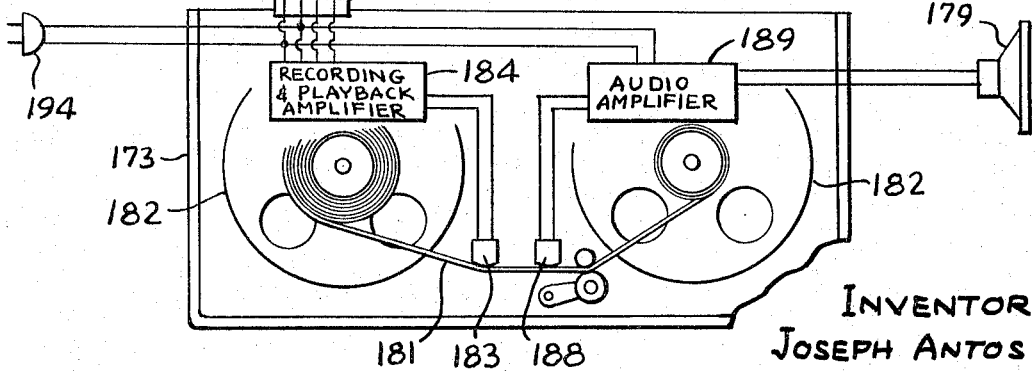

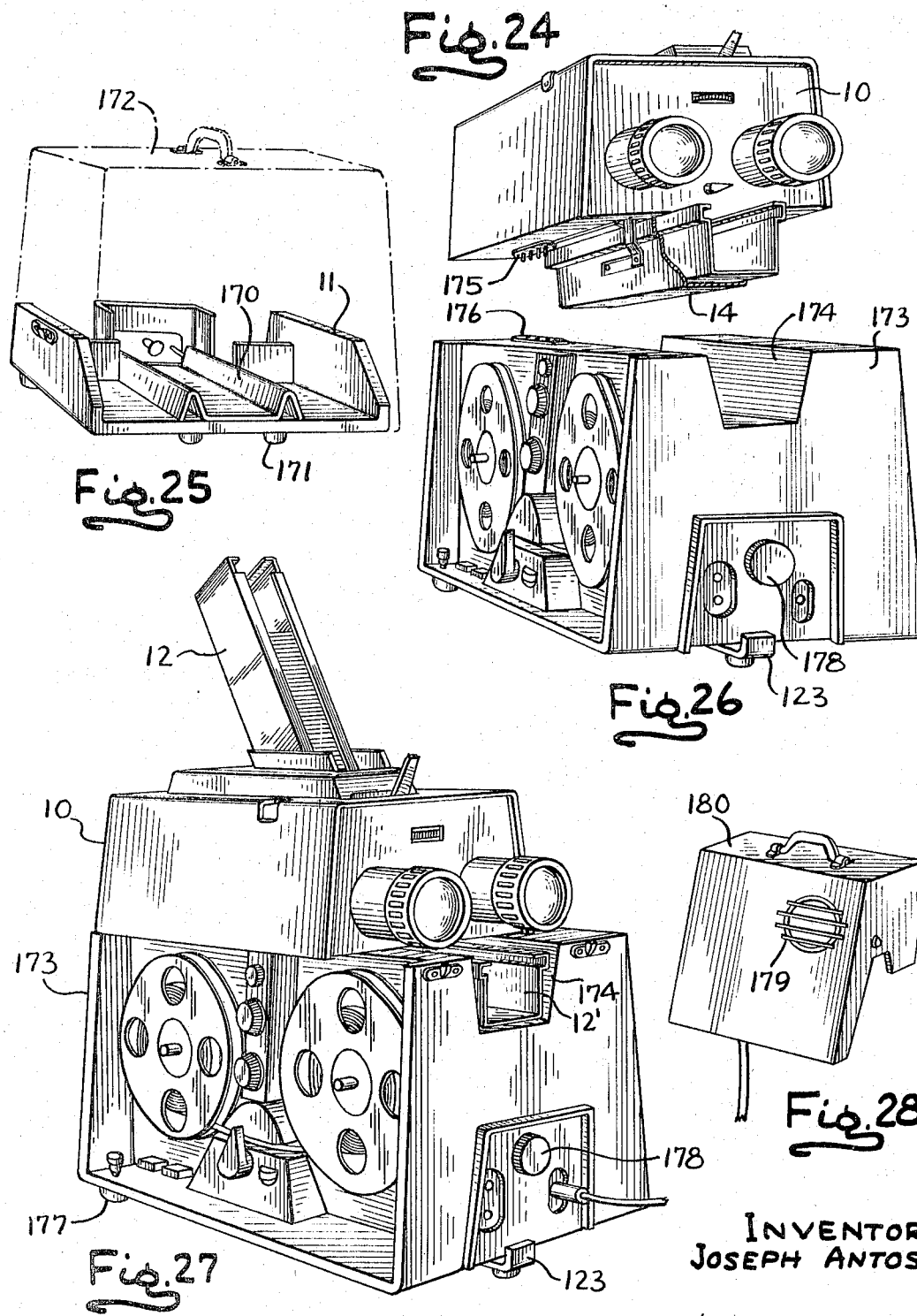

United States Patent Office 3,308,718
Patented Mar. 14, 1967

3,308,718
SHUTTER MECHANISM FOR SLIDE
PROJECTORS
Joseph Antos, Rte. 1, Box 18A, Jones Road,
Big Rock, Ill. 60511
Original application Nov. 9, 1962, Ser. No. 236,614, now
Patent No. 3,264,937, dated Aug. 9, 1966. Divided
and this application Dec. 15, 1965, Ser. No. 514,085
16 Claims. (Cl. 88—26)

The present application is a divisional application based on the copending application of Joseph Antos, Ser. No. 236,614, filed Nov. 9, 1962, now Patent No. 3,264,937.

The present invention relates in general to slide projecting apparatus and, more particularly, to an improved shutter mechanism for slide projectors of the type employing twin optical systems. In its principal aspects, the invention is concerned with an improved shutter mechanism of the foregoing type which permits, on a selective basis, either simultaneous image projection from both optical systems for use in projecting stereo or wide screen pictures or, alternatively, alternate image projection from the twin optical systems and wherein images projected alternately from the twin systems can be selectively blended into one another over a controllable blending period or wherein the changeover between display of alternate images takes place substantially instantaneously, thus permitting the projection of a substantially continuous screen image with a wide variety of special effects.

During recent years, the general public has displayed an ever increasing interest in the medium of slide projection and, as a result, many projection devices have been manufactured for automatically handling slides. However, such devices have been subject to many operating limitations which have made slide viewing less enjoyable for the viewing public. Merely by way of example, with conventional slide projection equipment, the viewer is subjected to annoying blackouts on the screen between slide changes. Moreover, such equipment generally has limited slide capacity and requires expensive and bulky storage facilities for the slides. One important and particularly vexing problem has been the difficulty encountered in preparing programs when slides are to be added to, or removed from, a previous program. In an effort to eliminate the problem of blackouts between slide changes, it has heretofore been the general practice to combine standard projectors or mechanisms into pairs. However, this has resulted in bulky and heavy equipment, awkward operations, and limited screen effects. Additionally, such duplication of standard equipment adds appreciably to the cost of the equipment installation.

It is a general aim of the present invention to provide an improved and highly versatile shutter mechanism for slide projectors of the type employing twin optical systems wherein images may be projected simultaneously from both systems so as to permit stereo and wide screen effects or, alternatively, so that images may be projected alternately from the twin optical systems with the changeover from one to the other system occurring either instantaneously or over a controlled blending interval, all at the control of the projectionist. While not so limited in its application, the invention will find especially advantageous use in the projection of images upon a screen from slides fed seriatim from a single stack and where the images from such slides may be selectively blended into one another, yet wherein the slides are restacked after viewing in the same order in readiness for the next showing.

Another object of the invention is to provide a shutter mechanism for slide projectors which permits of visual display of images projected from a plurality of slides in successive order, yet wherein any given image may be selectively faded in and out, and where successive images may be selectively blended together for different blending intervals so as to produce an interesting and pleasing program presentation.

It is a correlative object of the invention to provide a shutter mechanism for an automatic image blending slide projection apparatus which may be readily adjusted to produce substantially instantaneous changing of consecutive slides, yet which is characterized by its simplicity, economy of fabrication and reliability in operation.

In another of its important aspects, it is an object of the present invention to provide a highly versatile shutter mechanism for image blending slide projection apparatus of the type having twin optical systems which may be selectively utilized alternately to project images from slides in successive order, or utilized simultaneously to produce either superimposed images or side-by-side images from two slides.

More specifically, it is an object of the invention to provide an improved shutter mechanism for image blending projectors which is characterized by its ability to alternately open and close one of a pair of twin optical systems while simultaneously closing and opening the other of such systems, thus permitting selective image blending of the slides present in the twin systems at any given time, yet wherein the operator may readily adjust the twin optical systems to again project an image previously projected from the preceding slide, and wherein the change from one slide to another can be substantially instantaneous or where the operator can selectively blend the projected images together for variable intervals. As a consequence of attaining this objective, the operator can readily produce a wide variety of special effects such, for example, as the momentary flash of lightning, which effects are unusual and pleasant to the viewer.

Other objects and advantages of the invention will become apparent as the following description proceeds, taken in conjunction with the accompanying drawings, in which:

FIGURE 1 is a perspective view of a silent slide projection apparatus embodying the features of the present invention, here illustrating the apparatus with two slide magazines in operative position, one of which is used for feeding slides seriatim to the optical systems and the other of which is used for receiving slides seriatim following projection of the image therefrom;

FIG. 2 is a perspective view of one of the slide magazines shown in FIG. 1, here depicting the magazine loaded with slides;

FIG. 3 is a perspective view of the slide retainer which is slidably mounted in the magazine shown in FIG. 3;

FIG. 4 is a perspective view of a magazine cover for the slide magazine shown in FIG. 2;

FIG. 5 is a vertical cross-section through the slide magazine, here illustrating the magazine with the cover and slide retainer in place;

FIG. 7 is an elevational view illustrating the right side of the mechanism shown in FIG. 6 with a plurality of slides mounted in the feed hopper;

FIG. 8 is a fragmentary sectional view taken substantially along the line 8—8 of FIG. 6 and illustrating particularly the details of the slide changing mechanism just prior to changing of the slides;

FIG. 9 is a sectional view similar to FIG. 8, here illustrating the slide changing mechanism just after initiation of a slide changing cycle;

FIG. 10 is a fragmentary elevation of a portion of the left hand side of the projector with cover and base removed, and illustrating particularly the control linkage for actuating the slide changing mechanism;

FIG. 11 is a fragmentary rear elevational view partly in section, of the slide changing and transfer mechanism;

FIG. 12 is a sectional view taken substantially along the line 12—12 in FIG. 10 illustrating particularly the details of the slide transfer mechanism with slides positioned at the apertures in both optical systems and in a central feed position;

FIGS. 13 through 16 are fragmentary sectional views similar to FIG. 12 and illustrating particularly the sequential positions of the slide transfer mechanism during a complete slide changing cycle;

FIG. 17 is a perspective view of the twin shutter mechanisms of the present invention together with their associated control linkage;

FIG. 18 is a fragmentary perspective view similar to FIG. 17 and partly in section, here showing the twin shutters in reversed position;

FIG. 21 is a sectional view taken substantially along the line 21—21 of FIG. 17 and illustrating the details of the clutch actuating mechanism;

FIG. 22 is a fragmentary plan view, partly in section, illustrating particularly the details of the slide dispensing hopper and the clutch mechanism;

FIG. 23 is a schematic wiring diagram of some of the controls used with the projector shown in FIG. 1, and also illustrating in diagrammatic form a sound control base which can be used in conjunction with the projector apparatus and which here takes the form of a tape recorder.

FIG. 24 is a perspective view of the illustrative projector mechanism, here shown disassembled from a supporting base;

FIG. 25 is a perspective view of a silent tilt base suitable for supporting the projector shown in FIG. 24;

FIG. 26 is a perspective view of a sound control base suitable for supporting the projector mechanism shown in FIG. 24;

FIG. 27 is a perspective view illustrating the projector of FIG. 24 and the sound control base shown in FIG. 26, coupled together; and, FIG. 28 is a perspective view on a reduced scale illustrating the cover for the sound control base shown in FIG. 26, which cover also serves as a remote speaker during sound equipped programs.

Figure 6:
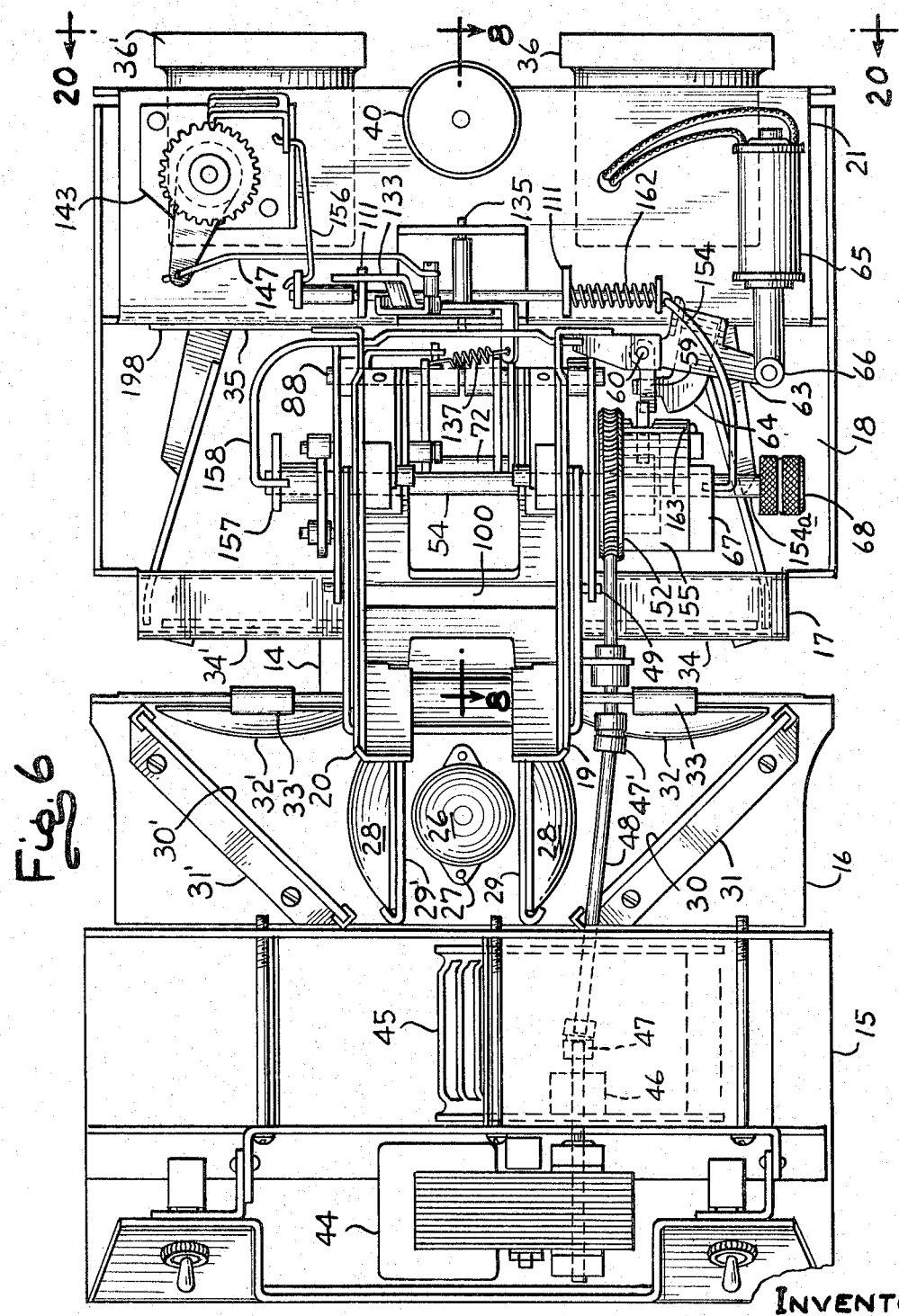
FIG. 6 is a plan view of the projector mechanism shown in FIG. 1, here illustrating the mechanism with the cover, base and slide magazines removed.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the invention is to cover all modifications, equivalents and alternatives falling within the spirit and scope of the invention as expressed in the appended claims.

Housing and support structure

Figure 20:
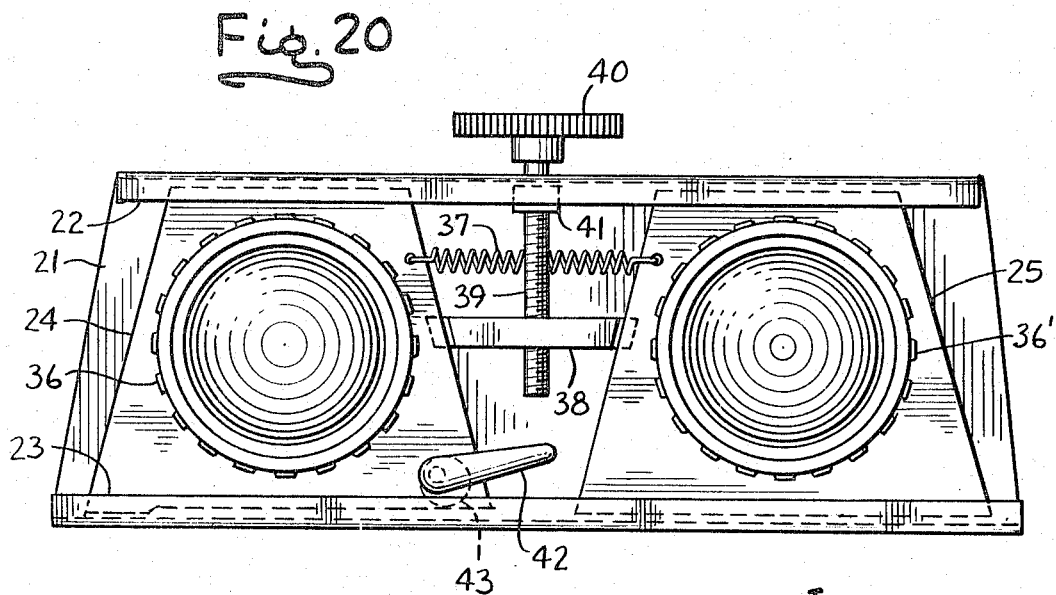
FIG. 20 is a front view of a portion of the projector mechanism taken substantially along the line 20—20 of FIG. 6

Referring now to the drawings, there is illustrated in FIG. 1, an exemplary slide projector particularly suitable for incorporation of the improved shutter mechanism of the present invention. As here illustated, the projector is set up for silent remote control operation and includes an exterior housing 10 mounted on a suitable base 11. For the purpose of supporting slides for seriatim feed through the projector, a slide magazine 12 is mounted in the top of housing 10. A second magazine 12' identical to the magazine 12 is supported beneath the housing 10. A remotely operable multiple signal control device 13 is plugged into the housing 10 for enabling the operator to change slides from a point remote from the projector. As best shown by reference to FIGS. 6 and 7, the various components of the projector housing are carried by a generally U-shaped channel 14 which also serves as a holder for the removable lower slide magazine 12' (FIGS. 1 and 11). Thus, the channel 14 supports from rear to front (left to right as viewed in FIGS. 6 and 7) a blower housing assembly 15, an L-shaped support bracket 16, a transverse slide transfer track 17 and a slide transfer base plate 18. The base plate 18 serves to support a pair of horizontally spaced, vertical slide plates 19, 20 (FIGS. 6 and 11) which define a slide hopper, top magazine socket and slide discharge chute. Fastened to the forward portion of the two vertical side plates 19 and 20 is a shutter assembly unit which is mounted on a shutter assembly plate 21. An upper track 22 and lower track 23 form a guideway for the twin lens support housing 24 and 25 (FIGS. 7, 10 and 20).

Optical system

To provide a light source for the twin optical systems, a standard projection lamp 26 (FIG. 6) is carried in a socket 27, the latter being disposed centrally of and secured to the upper surface of the L-shaped support bracket 16. A pair of right and left hand first condensing lenses 28, 28' respectively are mounted in holders 29, 29' and located on opposite sides of the lamp 26. Thus, light is emitted from the lamp 26 at right angles to the axis of the projector itself so as to form two oppositely directed light beams.

In the illustrative slide projector, provision is made for minimizing the amount of heat projected towards the slides, thus preventing warping and damage to the slides. To this end, a pair of dichroic mirrors 30, 30' are respecly mounted in the paths of the two light beams passing through lenses 28, 28'—such mirrors being characterized by their ability to transmit the heat producing infrared radiation in the beams while simultaneously reflecting the cooler radiant energy in the visible light spectrum. The exemplary mirrors 28, 28' are mounted in brackets 31, 31' which are rigidly secured to the support bracket 16 so as to reflect the visible light in a forward direction in two substantially parallel beams. As here shown, the mirrors 30, 30' are mounted so as to intercept the respective beams passing through lenses 28, 28' at an angle of approximately 45°.

A second pair of condensers 32, 32' are supported on the vertical leg of bracket 16 by clips 33 and positioned to transversely intersect the parallel light beams reflected by mirrors 30, 30'. The arrangement is such that the lenses 32, 32' are respectively alined with slide receiving apertures 34, 34' formed in the opposite ends of the slide transfer housing 17 (FIGS. 6 and 11). A shutter assembly plate 35 (FIGS. 6 and 10) is provided with light apertures in the path of the twin projected parallel light beams. The twin optical systems are completed by providing twin projection lenses 36, 36', which are adjustably held for both focusing and image alinement by right and left hand support housings 24, 25 (FIGS. 7 and 20).

Provision is also made for adjusting the twin light beams so as to permit images projected thereby to be selectively superimposed, overlapped, or juxtaposed in side-by-side relation, all at varying distances from the projector. To accomplish this, the exemplary apparatus includes a wedge block 38 (FIG. 20) which is interposed between the twin lens support housings 24, 25 and which slidably engages the facing inclined surfaces of the housings. A tension spring 37, having its opposite ends connected to respective ones of the housings 24, 25, is provided for urging the housings into intimate engagement with the wedge block 38. To permit horizontal lens spread adjustment (for both image convergence and side-by-side image presentation at varying distances), the wedge block 38 is coupled with a screw shaft 39 having an integral knurled whel 40. The shaft 39 rotates in a bearing 41 mounted in the shutter assembly plate 21. Thus rotation of the wheel 40 causes vertical movement of the wedge block 38 with a consequent variation in horizontal spread between the lenses 36, 36'. To permit vertical image adjustment, provision is made for slightly raising or lowering the right hand lens 36 and its support 24 relative to the lens 36'. To this end, a lever 42 having a cam 43 is pivotally mounted on the housing 24 with the cam positioned to engage the lower track 23. Thus, rotation of lever 42 serves to cam the housing 24 and lens 36 in a vertical direction relative to the track 23, and therefore relative to lens 36'.

Drive mechanism

In order to permit selective operation of the slide changing mechanism, a motor 44 (FIG. 6) is mounted on the rear portion of the blower housing. A blower wheel 45 is fastened to the motor shaft 46 for the purpose of cooling the projector. As best illustrated by reference to FIGS. 6 and 7 conjointly, a flexible coupling 47 mounted on the motor shaft 46 couples the latter with a drive shaft 48. The shaft 48, through a second coupling 47', transmits power to a drive worm and shaft 49. The drive worm and shaft 49 is mounted for rotation in bearings 50 (FIG. 7), the latter being carried by a bracket 51 secured to the vertical side plate 19. The worm 49 is meshed with a drive gear 52 which rotates freely on an upper shaft 54 journaled in the side plates 19, 20, thus permitting a selective power drive for the side changing mechanism.

Referring to FIGS. 21 and 22, it will be observed that gear 52 is provided with a notched hub 53 for selective engagement with a clutch unit 55 rigidly secured to the shaft 54. To drivingly couple the gear 52 to the clutch unit 55, a pawl 56 is pivotally secured by a pin 57 to the housing of the clutch unit. The hook portion of the pawl 56 is normally urged against the ratchet-like teeth of hub 53 by a spring 58, one end of which is rigidly secured to the housing of clutch unit 55. For normally disengaging the driving and driven clutch elements, a latch 59 is pivotally mounted on a pin 60 extending through a bracket 61, the latter being secured to the side plate 19 (FIG. 22). The latch 59 is urged to its innermost position where it engages the pawl 56 by means of a torque spring 62, thus serving to urge the hook portion of the pawl against the bias of the spring 58 so as to maintain the clutch in a disengaged position. A release lever 63, also pivoted on pin 60, is provided with a spring loaded hook 64 for pivoting the latch 59 about the pin 60 (counterclockwise as viewed in FIG. 22) so as to disengage the latch from pawl 56. To actuate the release lever 63, a solenoid 65 (FIGS. 6, 7 and 22) mounted on the shutter assembly plate 21 has its plunger linked directly to the release lever by a pin 66.

In operation, when the solenoid 65 is energized, its plunger is retracted, thus pivoting the release lever 63 and hook 64 about pin 60 so as to disengage the latch 59 from clutch pawl 56. At this time the pawl 56 is urged by spring 58 into engagement with the ratchet teeth on hub 53 of the drive gear 52. To insure that the clutch and associated mechanism is limited to a single revolution during each slide changing cycle, a cam finger 67 (FIG. 17) is rigidly mounted on the clutch housing and positioned to strike the spring loaded hook 64, disengaging the latter from latch 59. The latch is then biased by spring 62 back into engagement with pawl 56, disengaging the latter from the ratchet teeth on hub 53 and uncoupling the driving and driven clutch members.

The upper shaft 54, which is also provided with a knurled knob 68 for possible manual operation, rotates in bearings 69 (FIG. 22) mounted on the vertical side plates 19, 20. Rotation of the upper shaft serves to effect both feeding of slides from magazine 12 (FIGS. 8 and 9) and stacking of slides in the lower magazine 12'. To accomplish the slide feeding operation, power is transmitted from the upper shaft 54 (FIG. 17) to the lower shaft 72 by means of a pinion 70 attached to the upper shaft 54 and a gear 71 attached to the lower shaft 72. The lower shaft 72 is mounted for rotation in bearings 73 carried by side plates 19, 20 (FIGS. 12). In the exemplary apparatus, the gears 70, 71 are dimensioned such that the lower shaft 72 makes ½ revolution for each full revolution of the upper shaft 54.

Slide feeding mechanism

Referring to FIGS. 6, 11 and 22, there is illustrated an exemplary slide feeding mechanism suitable for use with the illustrative slide projector. As here shown, the slide feeding mechanism includes the two vertical slide plates 19, 20 which are spaced apart with a divider bar 74 and divider plate 75 (FIGS. 8, 9 and 10). With the addition of guide bars 76, a hopper-like space 77 is provided for either supporting a stack of slides 78 for projection, or for furnishing a socket for reception of the slide magazine 12 with its slides 78. In order to insure bottom support of a stack of slides 78, the divider bar 74 is furnished with a centrally positioned ledge 79. Attached to the inner forward portions of side plates 19, 20 are two narrow tracks 80 (FIGS. 9 and 22), their upper portions defining with ledge 79 a three-point support for the slide stack. The lower portions of tracks 80 define a slide guide, which along with divider plate 75, directs the slides 78 into the slide transfer track 17. Attached to and positioned over tracks 80 are feeler springs 82, which allow the passage of only one slide at a time regardless of slide thickness. A slide separating yoke 83 (FIGS. 10 and 22) having a narrow rear blade 84 and two forward blades 85 of thickness not more than the thinnest slide, straddles the hopper 77 with its stack of slides 78. The distance between the rear blade 84 and forward blades 85 is slightly greater than the width of a standard slide mount.

In the illustrative apparatus, provision is made for selectively stripping the lowermost slide from the stack positioned in hopper 77. To this end, yoke 83 is connected by pins 86 to a pair of side arms 87, 87', both of which are mounted on a shaft 88, which in turn is rotatably journaled in bearings 89 (FIG. 12) mounted on side plates 19, 20. The lower portions of the side arms 87, 87' (FIG. 7) are coupled by pins 90 with a lower yoke 91 (FIGS. 7 and 11) which is rigidly connected with a U-shaped slide stacker 92. The rear portion of the yoke 91 is guided in slots 93 formed in the channel 14.

In operation, rotation of the upper shaft 54 (FIG. 10) causes rotation of a cam 94 attached thereto. As the cam 94 rotates, it contacts an upper roller 95 which is mounted on the left hand side arm 87' by means of a pin 96, thus causing yoke 83 to move forward, its rear blade 84 engaging the lowermost slide 78 (FIG. 8) and pushing it off the supporting ledge 79 (FIG. 9). The feeler springs 82 adjust to the thickness of each slide and hold back the next slide (as shown in FIG. 9, the feeding and stacking mechanism has completed ½ cycle). To complete the second ½ of the feeding cycle, the cam 94 (FIG. 10) engages a roller 97 mounted on an overload lever 98 which, through overload release spring 99 is held against side arm 87', thus causing yoke 83 to move backward from the position shown in FIG. 9 to that shown in FIG. 8. When this occurs, the front yoke blades 85 engage the slide 78 causing it to fully separate from the upper slightly inclined stack, the tracks 80 tipping and directing the separated slide 78 into a receiving station 100 (FIGS. 8 and 12) in the center of the slide transfer track 17. Thus, the slides 78 are fed seriatim from the hopper 77 into the receiving station 100.

In the exemplary projector, and as disclosed and claimed in the aforesaid copending Antos application, provision is made for selectively shifting the slides 78 laterally from the centrally disposed receiving station 100 in the slide transfer track 17, with alternate ones of the slides shifted into alinement with different ones of the right and letf hand apertures 34, 34' respectively in the twin optical systems, and for restacking the slides after image projection in a single container or magazine 12' in the same order as the slides are fed into the receiving station, thus insuring that the restacked slides are ready for the next program presentation. As best shown by reference to FIGS. 12 through 16, this is accomplished by providing alternator means for shifting successive slides positioned in the receiving station 100 in opposite lateral directions in the transfer track 17, and by providing sweep means for shifting each slide laterally after image projection, to a centrally disposed discharge station 101 formed in the transfer track 17 and alined with the slide magazine 12'.

In order to facilitate an understanding of the illustrative slide feeding apparatus, the mechanism for effecting lateral slide movement will be described hereinbelow in conjunction with one complete operating cycle during which an image is projected from one slide in each aperture 34, 34'. For the purpose of this description let it be assumed that slides 78a, 78b and 78c are initially present at the left hand aperture 34', receiving station 100, and right hand aperture 34 respectively (FIG. 12). It shall also be assumed that an image has already been projected from the slide 78a in the left hand optical system (i.e., the system including aperture 34') and that an image is now being projected on the viewing screen by the slide 78c in the right hand optical system (i.e., the system including aperture 34).

In the apparatus shown merely by way of illustration, provision is made for sweeping the slide 78a out of the transfer track 17 and replacing it with a new slide 78b. To accomplish this, a cam 102 is mounted on shaft 72 for rotation therewith. A roller 103 is mounted on the cam 102 and positioned to engage a left lever 104 pivotally mounted on the shaft 88. The arrangement is such that when the shaft 54 begins to rotate, the shaft 72 (through pinion 70 and gear 71) is rotationally driven. Thus, the cam roller 103 engages the lever 104, pivoting the latter about shaft 88 (in a clockwise direction as viewed in FIG. 8). As the lever 104 pivots, it transmits motion through a connecting link 105 to a sweep arm 106, causing the latter to pivot about a mounting pin 108 rigid with the base plate 18 (that is, the sweep arm 106 pivots in a counterblockwise direction as viewed in FIG. 12). As the sweep arm 106 pivots, its outer tip 107 engages the slide 78a, shifting the latter into the discharge station 101 formed in the slide transfer track 17 (FIG. 13), thus permitting the slide 78a to drop downwardly into the magazine 12' (FIG. 8).

Continued rotation of the shaft 54 and its driving gear 71 causes a cam roller 109 mounted on the gear to engage the lower fork 110a of an alternator lever 110 (FIG. 8), pivoting the lever 110 about shaft 88. As the lever 110 pivots, motion is transmitted through a connecting link 113 (FIG. 12), thus pivoting an alternator arm 114 about a pivot pin 112 (in a clockwise direction as viewed in FIG. 12). The opposite end of the alternator arm 114 is here coupled to an alternator unit 116 by a connecting rod 115. Thus, clockwise pivotal movement of the arm 114 causes the alternator unit 116 to slide transversely along a track 118 from the right hand position shown in FIG. 13 to the left hand position shown in FIG. 14.

The foregoing action of the alternator unit 116 causes a centrally disposed shift bar 117 on the alternator unit to engage one edge of the slide 78b in the receiving station 100, pushing it outward to a point just beyond a divider wall 119 which separates the receiving and discharge stations (FIG. 14). Of course, it will be observed that as the slide 78b shifts, it will engage the tip portion 107 of lever 106, pivoting the latter outwardly. To insure that the slides are snapped against the transfer housing plate 17 in line with apertures 34, 34', a pair of curved slide positioning springs 120, 120' are rigidly mounted on the housing 17 and respectively associated with the apertures 34, 34'. Thus, the spring 120' serves to properly position slide 78b (as shown in FIG. 14) in readiness for image projection. During the last portion of this part of the slide changing cycle, a new slide 78 (FIGS. 8 and 9) is dislodged from the hopper 77 and drops into the receiving station 100 (this slide being represented in FIG. 15 by the identifying reference numeral 78d), while the slide 78a previously dropped into the rear portion of slide magazine 12' is pushed forward thru the movement of the slide stacker 92 (FIG. 9). A slide retaining spring latch 121 is pivotably attached at point 122 to the plate 18 in position to engage the top portion of slide stack in magazine 12' keeping it from tipping back when the stacker 92 moves back to receive another slide.

In order to discharge the slide 78c from the right hand optical system when the operator is finished projecting an image therefrom, the clutch 55 is again engaged to initiate a second revolution of the upper shaft 54. During the second revolution of the shaft 54, the lower shaft 72 is driven through the second half of its first complete revolution. As the drive gear 71 commences this portion of the slide changing cycle, the cam roller 109 contacts a right lever 124 which is similar to left lever 104 and which is also pivotally mounted on shaft 88. As the cam roller 109 engages the lever 124, the latter is pivoted about the shaft 88 (in a clockwise direction as viewed in FIG. 9) so as to effect, through connecting link 105, clockwise rotation (FIG. 12) of a right hand sweep arm 125. When this occurs, the tip portion 126 of the sweep arm 125 engages the outer edge of slide 78c, driving the latter into the discharge station 101 (FIG. 15).

During the final ¼ rotation of gear 71, the roller 109 contacts the upper fork 110b of the alternator lever 110, pivoting the lever 110 in a counterclockwise direction (as viewed in FIG. 8). As the lever 110 pivots, motion is transmitted through connecting link 113 to alternator arm 114, pivoting the arm in a counterclockwise direction about pivot 112 (FIG. 12) from the inner position shown in FIG. 15 to the outer position shown in FIG. 16. This motion of the alternator arm 114, through the connecting rod 115, causes alternator unit 116 to move to the right so that the opposite side of the shift bar 117 engages the inner edge of slide 78d, moving it outward within the confines of slide transfer housing 17, until the springs 120 dislodge the slide 78d from the divider wall 119 and snap it into alinement with the right hand aperture 34 ready for projection. It will be appreciated that during the period of time that the discharged slide 78c is being stacked in the lower magazine 12' by the slide stacker 92, a new slide is stripped from the bottom of the slide stack in hopper 77 (FIGS. 8 and 9) and dropped into the receiving station 100, the new slide being represented by the identifying reference numeral 78e in FIG. 16.

*Shutter mechanism and controls embodying the features of the present invention*

In accordance with one of the important aspects of the present invention, and for the purpose of permitting selective projection of images from one or the other of the twin optical systems while retaining the capability of selectively blending successive images into one another over a controlled blending interval, there is provided a novel shutter mechanism and actuating arrangement therefor. As best shown in FIG. 17, the shutter mechanism includes twin scissor-type shutter assemblies 127, 127' consisting of upper blades 128, 128' and lower blades 129, 129' respectively (FIG. 17). The blades are all pivotally mounted on the shutter assembly plate 21 (FIG. 6) by means of pins 131. Each pair of upper and lower blades are linked together for synchronized scissor-type action by means of mating notch and pin couplings as shown at 130, 130'. The inner end of the right hand shutter blade 129 is connected by a link 132 and a pivot arm pin 136 to a central shutter control lever 133, while the opposite or left hand shutter blade 129' is connected by a similar link 132' and pivot arm pin 136' to a repositioning lever 134. Both levers are held together by friction and are mounted on the frame at a common pivot point 135. When the main control lever 133 is swung to the right hand position as shown in FIG. 17, and the repositioning lever 134 is swung in the opposite direction, the pivot points 136 are placed approximately 90 degrees apart from the main pivot point 135, thus permitting the right hand shutter assembly 127 to be wide open and maintaining the opposite or left hand shutter assembly 127' fully closed.

Figure 19:
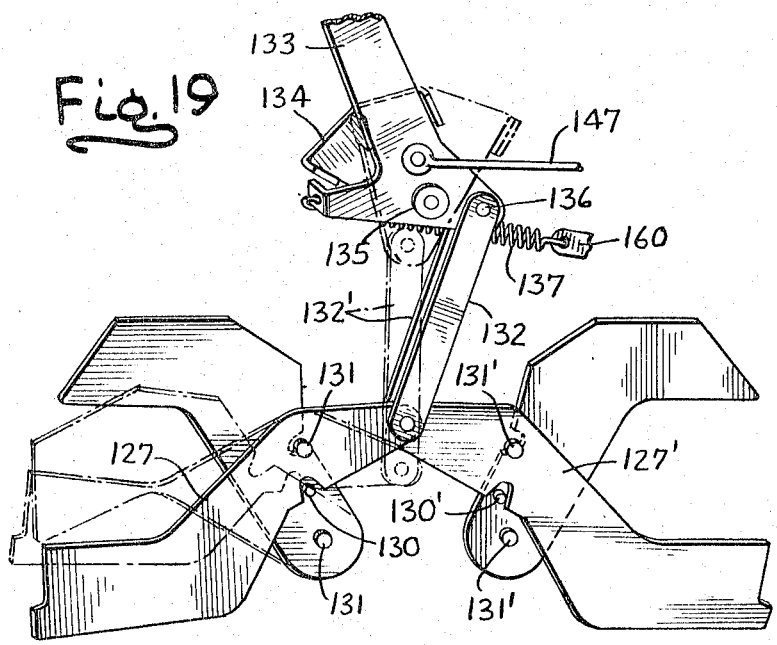
FIG. 19 is a fragmentary perspective view similar to FIGS. 17 and 18, here showing the twin shutters positioned for simultaneously projecting images from two slides.

In order to close the right hand shutter assembly 127 and open the left hand assembly 127', it is simply necessary to shift the central control lever 133 to the opposite or left hand position (FIG. 18) against the bias of the shutter energizing spring 137. When the lever is released, it will automatically return to its original position, thus permitting the operator to manually open the shutter for a desirable period of time. In the case of stereo or wide screen pictures where both images must be projected simultaneously, the repositioning lever 134 is manually pushed in the same direction as the central shutter control lever 133 until both pivot arm pins 136, 136' are in line (FIG. 19). This will cause the left hand shutter assembly 127' to open at the same time as the opposite or right hand assembly 127. Thereafter, movement of central control lever 133 will cause both shutter assemblies to close and open again in unison, both shutters closing just before the first slide is changed and opening again just after the second new slide appears in place. Also, in the case of stereo pictures, provision is made for mounting suitable filters (not shown) in the optical systems. To this end, filter supporting brackets 198 are mounted on the shutter assembly plate 21 (FIG. 7).

In accordance with another of the important aspects of the present invention, provision is made for blending the images projected by the twin optical systems during a slide changing cycle so as to eliminate undesirable and irritating blackout periods between consecutive slides. Preferably the blend time is selectively variable so as to permit a wide range of interesting special effects. To permit shutter blending at various speeds, a speed retarder unit 143 (FIGS. 10, 17 and 18) is mounted on top of the shutter assembly plate 21. In the exemplary form of the invention, the retarder unit includes a vertical spindle 144 on which a retarding hub 145 is rotatably mounted. The hub 145 is directly coupled to the central shutter control lever 133 by a lever 146 integral with the hub and a connecting link 147.

Referring more particularly to FIG. 18, it will be observed that the hub 145 is spaced from an upper intermediate motion retarding wheel 149 by a medium size area of silicone compound 148. Similarly, the hub 145 is spaced from a lower slow motion retarding wheel 150 by a large size area of silicone compound 151. A dual finger lever 152 is pivoted to the retarder unit 143 at point 153 and held in position by frictional contact. For the purpose of actuating the lever 152, a sequence selector rod 154 is slidably and pivotably mounted in bearings 111 carried by plate 21 (FIG. 6). The sequence selector rod 154 is coupled to the lever 152 by means of a connecting arm 155 and link 156 (FIGS. 6 and 17).

In normal operation, the remote multiple signal control unit 13 (FIGS. 1 and 23) is plugged into a circuit including the solenoid 65. As best shown in FIG. 23, the remote control unit 13 comprises a microswitch 138 coupled with a time delay unit 139 (here shown as including an hydraulic dashpot) and push buttons for instant contact 140, intermedite contact 141 and delayed contact 142. The arrangement is such that when the button 140 is depressed, the microswitch 138 is momentarily closed, thus completing an energizing circuit for the solenoid 65 and momentarily engaging the clutch 55, thereby causing a single rotation of the shaft 54 as previously described. As the clutch housing 55 rotates, the cam finger 67 mounted thereon engages the inwardly projecting end 154a of sequence selector rod 154, thus camming the rod to its downward limit (counterclockwise as viewed in FIG. 7). This causes the upper finger 152a of dual finger lever 152 to engage the intermediate motion retarding wheel 149.

Continued rotation of the shaft 54 causes a cam wheel 157 mounted thereon (FIGS. 6, 10 and 17) to lift up on a shutter brake rod 158 pivoted in side plates 19, 20. When this occurs, a projecting portion 158a of the brake rod 158 is pushed against the shutter control levers 133, 134 (FIG. 10), thus preventing operation of the shutters during the intermediate portion of the slide changing cycle. Further rotation of shaft 54 will cause the lower shaft 72 with its shutter cocking cam 102 to rotate from a down position (right hand shutter 127 open) as shown in FIG. 17, to an up position (left hand shutter 127' open) as shown in FIG. 18. This cams a spring anchor bracket 160 (which is mounted on the side plate 20 with freedom for vertical movement relative thereto) upward above pivot point 135, thus loading the shutter energizing spring 137 until it tends to pull shutter control lever 133 into the opposite direction. At the completion of the slide changing cycle, the cam wheel 157 allows shutter brake rod 158 to release its hold on the shutter control levers 133 and 134, thereby permitting the spring 137, which is anchored at one end to the bracket 160 and at the other end to the lever 133, to initiate a shutter reversing operation. When the control levers 133, 134 begin to shift, motion is imparted to the retarding hub 145 through the connecting linkage 146, 157. Since the upper intermediate motion retarding wheel 149 is engaged with the hub and at the same time locked against rotation by finger 152a, there is a slight retarding frictional drag between the two due to the small silicone retarding surface 148. This produces an intermediate blending action of approximately 1½ seconds duration between the change from one projected image to the next (as shown between FIGS. 17 and 18).

One of the important features of the invention is that the blending action described above can be selectively varied by the operator to provide substantially instantaneous image changing, image blending for an intermediate length time interval (e.g., 1½ seconds as described above), or a relatively long blending time interval (e.g., for approximately 7 seconds). To permit substantially instantaneous changing of successive projected images, the medium contact button 141 (FIG. 23) is depressed, thus pivoting the time delay link 139a about pivot 139b and closing the contacts for the microswitch 138. It will be appreciated that depression of button 141 as opposed to button 140, causes greater pivotal movement of the link 139a, with a consequent greater retraction of the plunger within the dashpot 139. Therefore, more time is required for the link 139a to return to the solid line position shown in FIG. 23. As a result, the microswitch 138 remains closed for a greater length of time and the solenoid 65 remains energized long enough to allow lever 63 (FIGS. 6, 7 and 17) to contact an overpower compression spring 162, thus pushing the sequence selector rod 154 inward so that its inward projecting portion 154a is positioned to be engaged by a second cam 163 mounted on the face of the clutch unit 55. As the clutch unit 55 rotates, the tip portion 154a of rod 154 rides up on the cam surface 163a of cam 163. The arrangement is such that the solenoid 65 is deenergized during the period when the rod 154 is in contact with the cam surface 163a, thus disengaging lever 63 from spring 162 and permitting the rod 154 to shift outwardly. This serves to disengage the tip 154a from the cam surface 163a at an intermediate point of the cycle, thereby positioning the dual finger lever 152 in an intermediate or neutral position so as to permit both the upper retarding wheel 149 and the lower retarding wheel 150 to free wheel with the retarding hub 145. Under these conditions, there is no retarding action, thus allowing the projected image to change instantly. The shutter assemblies 127, 127' reverse substantially instantaneously so as to change images with no intervening blackout period.

To produce still another desirable effect, for example, a very slow blend, the delay contact button 142 is depressed (FIG. 23). This causes energization of the solenoid 65 for a length of time equal to or somewhat longer than a single slide change cycle. As a result the tip portion 154a of rod 154 rides up on the peak portion 163b of the cam 163 during the final portion of the single rotational cycle of clutch unit 55 so as to lift the sequence selector rod 154 to its upward limit (FIG. 6). When this occurs, the dual finger lever 152 is pivoted about point 153 so as to cause the lower finger 152b to engage the lower slow motion retarding wheel 150, thus preventing free wheeling of the latter. In operation, the shutter action is retarded to provide a very slow blend speed of approximately 7 seconds due to the effect of the large silicone surface 151 adhering between the moving retarding hub 145 and the stationary wheel 150.

Slide magazine

Referring now to FIGURES 1–5, there is illustrated an exemplary slide magazine 12 which fiinds particularly advantageous use with the slide projector described above. As here shown, the magazine 12 is of the open end type suitable for stack feeding and also suitable for storing large numbers of slides. While it will be appreciated that the magazine 12 can be built to any desired length, it has been found that a magazine having a capacity of 100 to 200 slides appears to be most practical. The illustrative magazine 12 is substantially square (FIG. 2), comprising a bottom and two sides, the top side being open to permit ready access for either group loading or rearranging and removal of slides 78, such as is necessary in editing a program. Both upper portions of the slide magazine 12 are formed into tracks 164 for slidably receiving a U-shaped spring loaded slide retainer 166 which holds the slides tight against the flanges 165 at the opposite end of magazine. A top cover 167 (FIG. 4), preferably made of clear plastic with molded ratchet-like teeth 168, engages and locks the slide retainer 166 in place when it is snapped over the magazine 12. This construction permits large numbers of slides to be economically stored, at the same time staying flat and dust free. The slide stack, since it is held tightly together, can be marked on top with one or more diagonal lines 169 (FIG. 2) for visual identification and verification of slide sequences. To load the magazine 12 into the projector, the cover 167 is removed, the open end (opposite flanges 165) is inserted into the hopper portion 77 of the projector, and the U-shaped retainer 166 is squeezed together and removed, thus allowing the slides to feed freely into the mechanism. A second empty magazine 12' having a slide retainer 166 in place, is then inserted into the channel 14 of the slide projector for the purpose of receiving slides discharged from the discharge station 101.

Plug-in arrangement for synchronization with sound control base

When the illustrative slide projector is used in presenting a silent slide program, the housing unit 10 is usually furnished with an accompanying silent tilt base unit 11. The base 11 is here provided with a positioning channel 170 (FIG. 25) which permits locating and locking of both units together. The bottom of the base 11 is further provided with rubber positioning feet 171, the forward ones being adjustably positioned to permit selective front elevation of the projector. A suitable cover 172 (indicated by a broken line in FIG. 25) is fastened over the base 11 and offers protection for the projector unit 10 while also serving as a convenient carrying case.

Provision is also made for readily plugging the projector 10 into a matching sound control base 173 which permits fully automated sound projection. To this end, the base 173 is formed with a necessary cutout 174 to fit under and receive the channel 14 on the projector assembly 10 (FIGS. 26 and 27). Electrical connections conveniently take the form of a multiple plug connector 175 in the bottom portion of the projector housing 10 (FIGS. 23 and 24) and a matching socket 176 located in the upper portion of the record unit 173 (FIGS. 23 and 26). The control recorder unit 173 may also be provided with a screw type adjustable foot 177 at the rear for side tilt control and a center front elevation control foot 123, operable thru knob 178 (FIGS. 26 and 27). The sound control base 173 is also provided wtih a detachable cover 180 shown in reduced scale in FIG. 28) having a built in speaker 179. In operation, the speaker 179 permits sound to come from the area of the projected image (i.e., from the vicinity of the viewing screen). The cover 180 is built to fit over the combined sound slide blending projector unit so as to serve both as a protective medium and a carrying case. As shown in FIG. 27, the tape transport mechanism of the recorder unit 173 is generally of convenient construction. However the control panel is preferably positioned vertically with controls grouped between the reels.

Referring to the schematic wiring diagram in FIG. 23, both control signals and accompanying sound are carried side by side on a standard ribbon of tape 181. Between the two reels 182, a transducer head 183 is positioned to contact one half of the tape. A recording and playback amplifier 184 is coupled to the transducer head 183 and separably coupled to the solenoid 65 through the plug 175 and receptacle 176. The remote multiple signal control unit 13 is connected with the circuit by a connector 185, thus permitting recording of variable length signals. A rectifier 186 and a condenser 187 are provided in the solenoid energizing circuit for changing the alternating current to direct, thus eliminate solenoid chatter. A second transducer head 188 is positioned to contact the other half of the tape 181 while an audio amplifier 189 is connected between the transducer head 188 and the speaker 179.

While both the projector 10 and the control recorder unit 173 may derive their power from one common power input 194, the projector 10 is provided with a second power input 193 which can be used when the projector is mounted on a silent tilt base 11. A three way switch 195 permits turning on the blower 45 and mechanism only (FIG. 23) or, alternatively, the blower and mechanism plus lamp. Another manual switch 196 is provided for selectively turning on full light value, or partial light level thru resistor 197.

While the invention has been described in connection with a novel apparatus for projecting slide images upon a viewing screen, those skilled in the art will appreciate that the sequence of operations described herein also define a novel method for feeding slides seriatim from a single supply stack through a twin lens projector assembly, and thence seriatim to a single discharge stack where the successive slides are stacked in the same order in readiness for the next program presentation. Such novel apparatus and method form the subject matter of the aforesaid copending Antos application. In carrying out such method, a plurality of slides are first arranged in a single stack to form a particular program. The slides are then successively stripped from the stack and fed seriatim to a receiving station where alternate slides are shifted laterally to different ones of twin optical systems. Images are selectively projected either alternately from the twin optical systems or simultaneously therefrom (if stereo or wide screen presentation is desired). The slides are then shifted laterally in successive order to a common discharge chute, from where they fall by gravity into a common discharge magazine and are stacked in the original program order. During shifting of the slides, the operator may selectively vary the duration of the image blending periods.

I claim as my invention:

1. A shutter assembly for use with a slide projector of the type employing twin optical systems comprising, in combination, a pair of shutter mechanisms respectively associated with different ones of said twin systems, means for selectively and alternately opening and closing said shutter mechanisms, means for controlling said shutter mechanisms so that closure of one of said mechanisms is accompanied by opening of the other of said mechanisms with at least one of said mechanisms open at all times, and operator controlled means for selectively controlling the time required for said shutter mechanisms to shift between open and closed states so that said shutter mechanisms may be selectively shifted at either of relatively fast and relatively slow speeds.

2. A shutter assembly as set forth in claim 1 further characterized in that said means for controlling the time required for said shutter mechanisms to shift comprises a retarder unit, said retarder unit including means for establishing selectively one of diverse retarding forces and means for remotely selecting a desired retarding force.

3. A shutter assembly as set forth in claim 1 further characterized in that means are provided for biasing said shutter mechanisms into a selected one of the two alternate conditions with one of said mechanisms open.

4. A shutter assembly as set forth in claim 3 further characterized in that manually operable means are provided for selectively overcoming said biasing means for a selectable period of time so as to open and close respective ones of the closed and open shutter mechanisms while the latter are urged toward their closed and open conditions respectively by said biasing means.

5. A shutter assembly as set forth in claim 4 further characterized in that said means for selectively and alternately opening and closing said shutter mechanisms includes means for shifting said biasing means so as to bias said shutter mechanisms into the other of the two alternate conditions with the other of said mechanisms open, said manually operable means for selectively overcoming said biasing means for a selectable period of time so as to open and close respective ones of the closed and open shutter mechanisms while the latter are urged toward their closed and open conditions respectively by said biasing means being effective irrespective of the position of the latter.

6. A shutter assembly as set forth in claim 1 further characterized in that said means for controlling the time required for said shutter mechanisms to shift includes first selectively operable control means for permitting substantially instantaneous shifting of said shutter mechanisms between their open and closed states, and at least one second selectively operable control means for permitting retarded shifting of said shutter mechanisms between their open and closed states.

7. A shutter assembly as set forth in claim 1 further characterized in that said means for controlling the time required for said shutter mechanisms to shift includes first selectively operable control means for permitting substantially instantaneous shifting of said shutter mechanisms between their open and closed states, second selectively operable control means for permitting retarded shifting of said shutter mechanisms between their open and closed states whereby said mechanisms are both at least partially open during a first relatively short blend interval, and third selectively operable control means for permitting retarded shifting of said shutter mechanisms between their open and closed states whereby said mechanisms are both at least partially open during a second relatively long blend interval.

8. The combination set forth in claim 6 further characterized in that said first and second selectively operable control means are remotely operated on a selective basis by a projectionist.

9. For use with a slide projector of the type employing twin projection lenses, the combination comprising, a shutter assembly plate, a pair of shutter mechanisms respectively associated with different ones of said twin lenses, each of said mechanisms including paired upper and lower shutter blades with all of said blades pivotally mounted on said plate, means coupling the upper shutter blade of each pair to its paired lower shutter blade for insuring synchronized scissor-type action of each shutter mechanism, control lever means pivotally mounted on said plate, means coupling said control lever means to at least one blade in each pair with one of said blade pairs open and the other of said blade pairs closed so that pivotal movement of said control lever means causes said open blade pair to close and said closed blade pair to simultaneously open, and operator controlled means for selectively controlling the time required for said blade pairs to shift between open and closed states so that said blade pairs may be selectively shifted at either of relatively fast and relatively slow speeds.

10. The combination set forth in claim 9 further characterized in that means are provided for pivoting said control lever means between a first limit position with one of said blade pairs open and the other of said blade pairs closed and a second limit position with the states of said blade pairs reversed, said operator controlled means comprising selectively operable retarder means coupled to said control lever means for controlling the time interval required to shift said control lever means between said first and second limit positions.

11. The combination set forth in claim 9 further comprising a spring anchor bracket adapted to be mounted on said projector with freedom for movement between spaced limit positions, a spring having its opposite ends bottomed on respective different ones of said bracket and said control lever means, said spring adapted to bias said control lever means in one direction about its pivot when said bracket is in one of said limit positions and in the opposite direction about its pivot when said bracket is in the other of said limit positions, and means for selectively shifting said bracket between its limit positions so as to alternately reverse the closed and open states of said shutter mechanisms.

12. The combination as set forth in claim 11 further characterized in that selectively operable retarder means are coupled to said control lever means for opposing the biasing force provided by said spring and thus controlling the time interval required to shift said shutter mechanisms from one to the other of their closed and open states.

13. The combination as set forth in claim 12 further characterized in that cyclically operable braking means are provided for momentarily preventing pivotal movement of said control lever means upon shifting of said bracket from one to the other of its limit positions.

14. The combination as set forth in claim 12 further characterized in that said selectively operable retarder means includes (1) a first friction retarding device for establishing a relatively short interval of time required to reverse said shutter mechanisms, (2) a second friction retarding device for establishing a relatively long interval of time required to reverse said shutter mechanisms, and (3) projectionist controlled means for selectively activating one of said first and second retarding devices while deactivating the other of said first and second retarding devices so as to permit retarded reversal of said shutter mechanisms during a selected one of two different controlled time intervals and for alternatively and selectively deactivating both of said retarding devices so as to permit substantially instantaneous reversal of said shutter mechanisms.

15. The combination as set forth in claim 9 further characterized in that said control lever means includes first and second control levers mounted on said plate for pivotal movement about a common pivot and means coupling said first and second control levers to respective different ones of said pairs of shutter blades, said first and second control levers being frictionally engaged with one another for pivotal movement in unison and free for limited pivotal movement relative to one another between a first frictionally engaged position with one pair of shutter blades open and the other pair closed and a second frictionally engaged position with both pairs of shutter blades occupying one of the closed and open states, whereupon pivotal movement of said levers in unison while in said first frictionally engaged position causes one of said shutter mechanisms to close while the other of said shutter mechanisms simultaneously opens, and pivotal movement of said levers in unison while in said second frictionally engaged position causes both of said shutter mechanisms to simultaneously shift from one to the other of the closed and open positions with both shutter mechanisms closing and opening in unison.

16. The combination as set forth in claim 15 further characterized in that means are provided for pivoting said first and second control levers between first and second limit positions so as to simultaneously reverse the closed and opened positions of said shutter mechanisms, and selectively operable retarder means coupled to one of said control levers for controlling the time interval required to shift said control levers between said first and second limit positions.

References Cited by the Examiner
UNITED STATES PATENTS

| | | | |
|---|---|---|---|
| 450,815 | 4/1891 | McClintock | 88—28 |
| 947,471 | 1/1910 | Klaiber | 88—28 |
| 968,667 | 8/1910 | Klaiber. | |
| 1,365,752 | 1/1921 | Vischer | 88—28 |
| 1,738,943 | 12/1929 | Brenkert et al. | |
| 2,259,651 | 10/1941 | McClure | 352—34 |
| 2,448,220 | 8/1948 | Jenkins | 352—135 |
| 2,528,855 | 11/1950 | Cadwell et al. | |
| 2,530,417 | 11/1950 | Young | 88—28 |
| 2,655,833 | 10/1953 | Krows | 352—210 |
| 2,705,439 | 4/1955 | Waller | 88—28 |
| 2,922,335 | 1/1960 | Lacoe | 88—28 |
| 2,942,365 | 6/1960 | Badalich | 40—79 |
| 2,973,689 | 3/1961 | Bailey | 88—28 |
| 3,014,296 | 12/1961 | Walter | 40—97 |
| 3,033,077 | 5/1962 | Schwartz et al. | 88—28 |
| 3,093,030 | 6/1963 | Carrillo | 352—198 X |

NORTON ANSHER, *Primary Examiner.*

H. H. FLANDERS, *Assistant Examiner.*